United States Patent
Xiao et al.

(10) Patent No.: US 8,576,916 B2
(45) Date of Patent: Nov. 5, 2013

(54) METHOD AND APPARATUS FOR REDUCING BUS TRAFFIC OF A TEXTURE DECODING MODULE IN A VIDEO DECODER

(75) Inventors: Shu Xiao, San Diego, CA (US); Junchen Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1266 days.

(21) Appl. No.: 12/247,720

(22) Filed: Oct. 8, 2008

(65) Prior Publication Data

US 2010/0086057 A1    Apr. 8, 2010

(51) Int. Cl.
  *H04N 7/12* (2006.01)
  *H04N 11/04* (2006.01)

(52) U.S. Cl.
  USPC ............ 375/240.24; 375/240.12; 375/240.13; 375/240.14; 375/240.15; 382/236; 382/237; 382/238

(58) Field of Classification Search
  USPC .................................................. 375/240.24
  See application file for complete search history.

(56) References Cited

U.S. PATENT DOCUMENTS

| | | | |
|---|---|---|---|
| 6,823,016 B1 | 11/2004 | Nguyen et al. | |
| 6,927,710 B2 | 8/2005 | Linzer et al. | |
| 7,190,724 B2 | 3/2007 | Chen et al. | |
| 7,840,768 B2 | 11/2010 | Stiffler et al. | |
| 2003/0194007 A1* | 10/2003 | Chen et al. | 375/240.2 |
| 2004/0085233 A1 | 5/2004 | Linzer et al. | |

FOREIGN PATENT DOCUMENTS

| | | |
|---|---|---|
| JP | 2003348598 A | 12/2003 |
| JP | 2009518917 A | 5/2009 |
| WO | WO 2007/06612 A2 * | 6/2007 |
| WO | WO20070066121 | 6/2007 |

OTHER PUBLICATIONS

Gao, et al.: "Lossless memory reduction and efficient frame storage architecture for HDTV video decoder," Audio, Language, and Image Processing, 2008, ICALIP 2008, Intl Conference on, IEEE Piscataway, NJ, US, Jul. 7, 2008, pp. 593-598, ISBN: 978-1-4244-1723-0, pp. 593-595 sect I-2.2.

International Search Report & Written Opinion—PCT/US2009/060051, International Search Authority—European Patent Office—Mar. 10, 2010.

Mihaela V D Schaar-Mitrea et al: "Novel embedded compression algorithm for memory reduction in MPEG codecs" Proceedings of the SPIE—The International Society for Optical Engineering, SPIE, US, vol. 3653, Dec. 28, 1998, pp. 864-873, XP007902593 ISSN: 0277-786X abstract figure 2 pp. 868-869, section 3.4.

memory reduction in MPEG codecs Proceedings of the SPIE—The International Society for Optical Engineering, SPIE, US, vol. 3653, Dec. 28, 1998, pp. 864-873, XP007902593 ISSN: 0277-786X abstract figure 2 pages 868-869, section 3.4.

(Continued)

*Primary Examiner* — Longbit Chai
(74) *Attorney, Agent, or Firm* — Kevin T. Cheatham (57) ABSTRACT

Techniques for reducing bus traffic during texture decoding of a video bitstream are provided. In one configuration, a wireless communication device (e.g., cellular phone, etc.) comprises a processor configured to execute instructions operative to decode and separate in a bitstream macroblock (MB) information and residual packet data. The residual packet data is used to generate codec-independent non-zero MB-packets having a universal order that is codec independent. The codec-independent non-zero MB-packets and MB information are then used for reconstructing pixels of a respective frame of the video bitstream.

30 Claims, 9 Drawing Sheets

(56) References Cited

OTHER PUBLICATIONS

SMPTE Standard VC-1 Compressed Video Bitstream Format and Decoding Process, Feb. 24, 2006, pp. 22, 120-198, 253-323.
ITU-T Telecommunication Standardization Sector of ITU H.264. Series H: Audiovisual and Multimedia Systems: Infrastructure of Audiovisual Services—Coding of moving video. Nov. 2007. pp. 18-23, 169-188.
CAN/CSA-ISO/IEC 14496-2:05 (ISO/IEC 14496-2:2004). Information technology—Coding of audio-visual objects—Part 2: Visual. Oct. 2005. pp. 22-27, 38-135, 239-250.

* cited by examiner

MPEG4

| 0 | 1 | 2 | 3 |
|---|---|---|---|
| 4 | 5 | 6 | 7 |
| 8 | 9 | 10 | 11 |
| 12 | 13 | 14 | 15 |

Cr
256+

| 0 | 1 | 2 | 3 |
|---|---|---|---|
| 4 | 5 | 6 | 7 |
| 8 | 9 | 10 | 11 |
| 12 | 13 | 14 | 15 |

| 0 | 1 | 2 | 3 | 16 17 18 19 | | | |
|---|---|---|---|---|---|---|---|
| 4 | 5 | 6 | 7 | | | | |
| 8 | 9 | 10 | 11 | | | | |
| 12 | 13 | 14 | 15 | | | | |

METHOD AND APPARATUS FOR REDUCING BUS TRAFFIC OF A TEXTURE DECODING MODULE IN A VIDEO DECODER

BACKGROUND

1. Field

The present disclosure relates generally to the field of video processing and, more specifically, to techniques for reducing bus traffic of a texture decoding module in a video decoder.

2. Background

The amounts of digital information contained in video data are massive and tend to increase along with advances in performance of video cameras. Processing of the video data places large demands on memory, computational, bandwidth, and power resources of video-enabled devices and, in particular, battery-powered wireless communication devices such as cellular phones, personal digital assistants (PDAs), laptop computers, and the like.

In video processing systems compliant with Motion Picture Expert Group (MPEG-4)/VC-1/H.264 standards, the coefficients of each macroblock of a bitstream are described using 384 16-bit words. In a video decoder, a video bitstream is inputted to an ARM or DSP processor to perform syntax element parsing, and the decoded residual data is un-zigzagged to define, in a raster-scan order, 384 quantized coefficients for each macroblock of the bitstream. The quantized coefficients are then inputted to a Texture Decoding hardware (HW) module in a Pixel Processor accelerator of a video processor.

A texture decoding process includes procedures such as de-quantization, inverse transform to form residual macroblocks, and adding motion compensated macroblocks to generate reconstructed macroblocks. For a display rate of WVGA at 30 frames per second, 384 coefficients per macroblock inputted to the Texture Decoding module generate 104 MBps data traffic. Specifically, when the ARM or DSP writes the quantized coefficient data to external memory, the Texture Decoding HW module fetches the data back, and write cache-miss produces a doubled amount of the bus traffic. Although video compression significantly reduces redundancy of compressed video data, such processing techniques may decrease overall performance and consumer-critical characteristics (for example, battery life, talk time, etc.) of the wireless communication devices.

There is therefore a need in improved techniques for reducing bus traffic during texture decoding in macroblocks of video bitstreams.

SUMMARY

Techniques for reducing bus traffic during texture decoding in a video bitstream are described herein. In one embodiment, a wireless communication device (e.g., cellular phone, etc.) comprises a processor configured to execute instructions operative to separate in a bitstream macroblock (MB) information and residual packet data. Then codec-independent non-zero MB-packets are generated from the residual packet data. The pixels are re-constructed from the codec-independent non-zero MB-packets and the MB information.

Various other aspects and embodiments of the disclosure are described in further detail below.

The Summary is neither intended nor should it be construed as being representative of the full extent and scope of the present disclosure, which these and additional aspects will become more readily apparent from the detailed description, particularly when taken together with the appended drawings.

To facilitate understanding, identical reference numerals have been used, where possible, to designate identical elements that are common to the figures, except that suffixes may be added, when appropriate, to differentiate such elements. The images in the drawings are simplified for illustrative purposes and are not necessarily depicted to scale.

The appended drawings illustrate exemplary configurations of the disclosure and, as such, should not be considered as limiting the scope of the disclosure that may admit to other equally effective configurations. Correspondingly, it has been contemplated that features of some configurations may be beneficially incorporated in other configurations without further recitation.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs. Hereafter, the terms "core", "engine", "machine", "processor" and "processing unit", as well as the terms "frame" and "picture" are used interchangeably.

The techniques described herein may be used in various devices and systems for wireless and wired communications or computing, in personal electronics apparatuses, handsets, and the like. An exemplary use of these techniques for wireless communications is described below.

Figure 1:
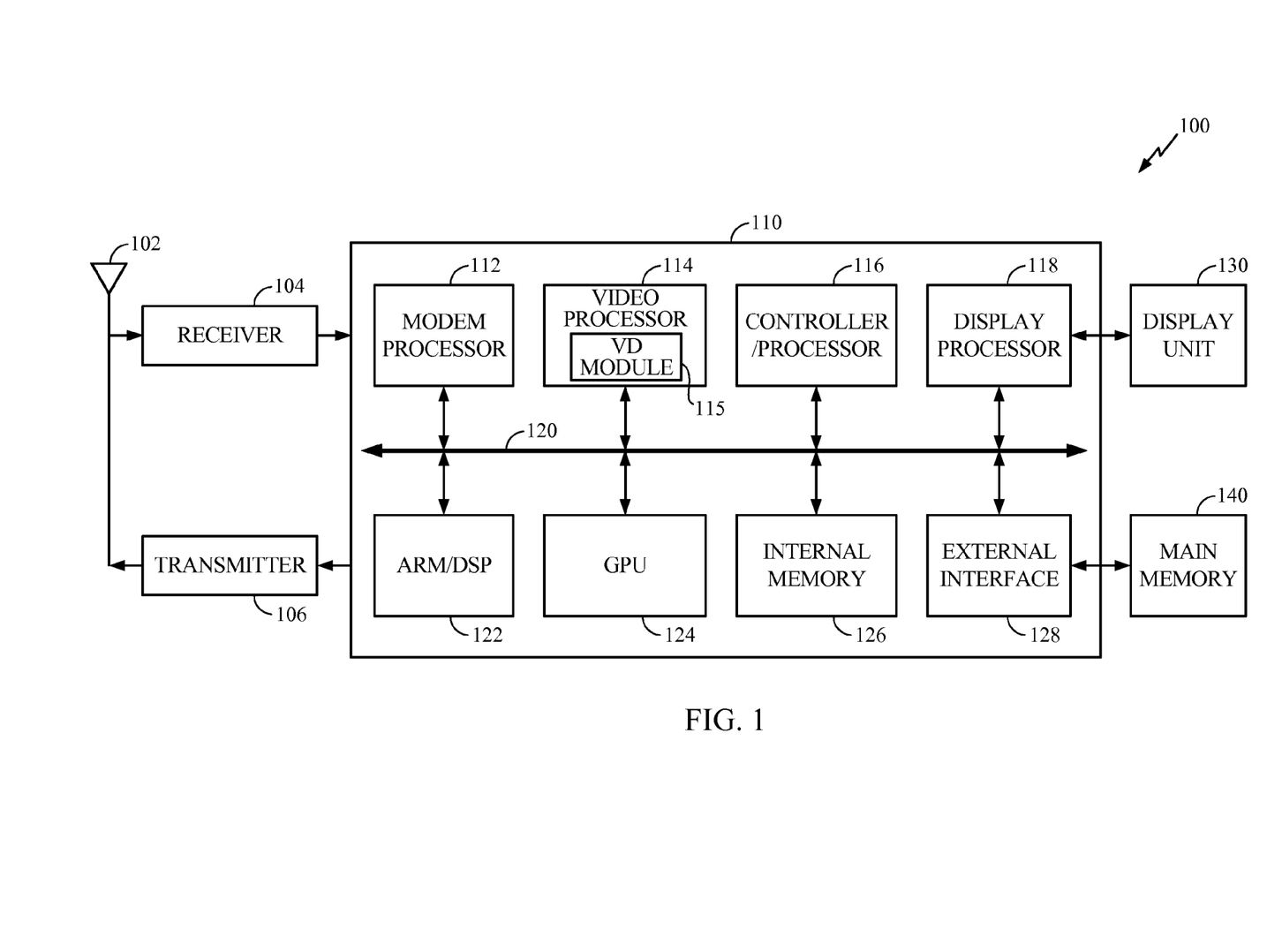
FIG. 1 shows a high-level block diagram of a wireless device.

FIG. 1 shows a block diagram of a configuration of a wireless device 100, which incorporates elements of the present disclosure and may be used in a wireless communication system (not shown). The wireless device 100 may, for example, be a cellular phone (i.e., handset), a video game console, a PDA, a laptop computer, or a video or audio/video enabled device, and the wireless communication system may be a Code Division Multiple Access (CDMA) system or a Global System for Mobile Communications (GSMC), among other wireless communication systems.

The wireless device 100 generally includes an antenna 102, a receiver 104, a transmitter 106, a digital section 110, a display unit 130, and a main memory 140. Bi-directional communications with a respective base station of a wireless communication system are provided via receive and transmit paths. In the receive path, signals transmitted by a base station are received by the antenna 102 and provided to the receiver 104. The receiver 104 demodulates the received signals and forwards demodulated signals for further processing to the digital section 110. In the transmit path, the transmitter 106 acquires from the digital section 110 data to be transmitted, generates a carrier signal modulated by the data, and forwards the modulated carrier signal to the antenna 102 for transmitting to the base station.

The digital section 110 illustratively comprises a modem processor 112, a video processor 114, a controller/processor 116, a display processor 118, an Advanced RISC (reduced instruction set computer) Machine/digital signal processor (ARM/DSP) 122, a graphics processing unit (GPU) 124, an internal memory 126, an internal bus 120, and an external interface 128. In operation, elements of the digital section 110 are administered by the controller/processor 116.

The modem processor 112 performs processing (e.g., modulation/demodulation) of data provided by the receiver 104 or directed to the transmitter 106. The video processor 114 performs processing such as encoding/decoding, or codec, operations for video bitstreams (e.g. still or motion images) produced by video applications such as a camcorder, video playback, video conferencing, and the like. Correspondingly, the display processor 118 facilitates rendering of the decoded images on the display unit 130 of the wireless device 100.

The GPU 124, in combination with the ARM/DSP 122, facilitates graphics processing operations for the wireless device 100. The GPU 124 may be compliant, for example, with a document "OpenGL Specification, Version 1.0," Jul. 28, 2005, which is publicly available. This document is a standard for 2D vector graphics suitable for handheld and mobile devices, such as cellular phones and other referred to above wireless communication apparatuses. Additionally, the GPU 124 may also be compliant with OpenGL2.0, OpenGL ES2.0, or D3D9.0 graphics standards.

Functional elements of the digital section 110 may be fabricated as or include application specific integrated circuits (ASICs), RISCs, field programmable gate arrays (FPGAs), micro-controllers or microprocessors, among other types of integrated circuits.

Compressed video bitstreams received or transmitted by the wireless device 100 are generally compressed using video coding techniques compliant with one or more of industry-adapted video compression and communication standards. In one embodiment, the compressed video bitstreams are compliant with at least one MPEG/VC-1/H.264 standard. Decoding of MPEG/VC-1/H.264-compliant video bitstreams includes texture decoding in macroblocks of the respective frames and, in particular, determining of quantized coefficient data of the macroblocks.

In the digital section 110, the video processor 114 comprises a Video Decoder (VD) module 115, which is configured to perform texture decoding in macroblocks in accordance with embodiments of the present disclosure, thus increasing effectiveness of utilization of memory, computational bandwidth, and power resources of the wireless device 100. In particular, the VD module 115 reduces an amount of coefficient data to be stored in the internal memory 126 (or main memory 140) and being consequently transferred for processing to a pixel processor 360 (shown in FIG. 3) of the VD module 115.

Figure 2:
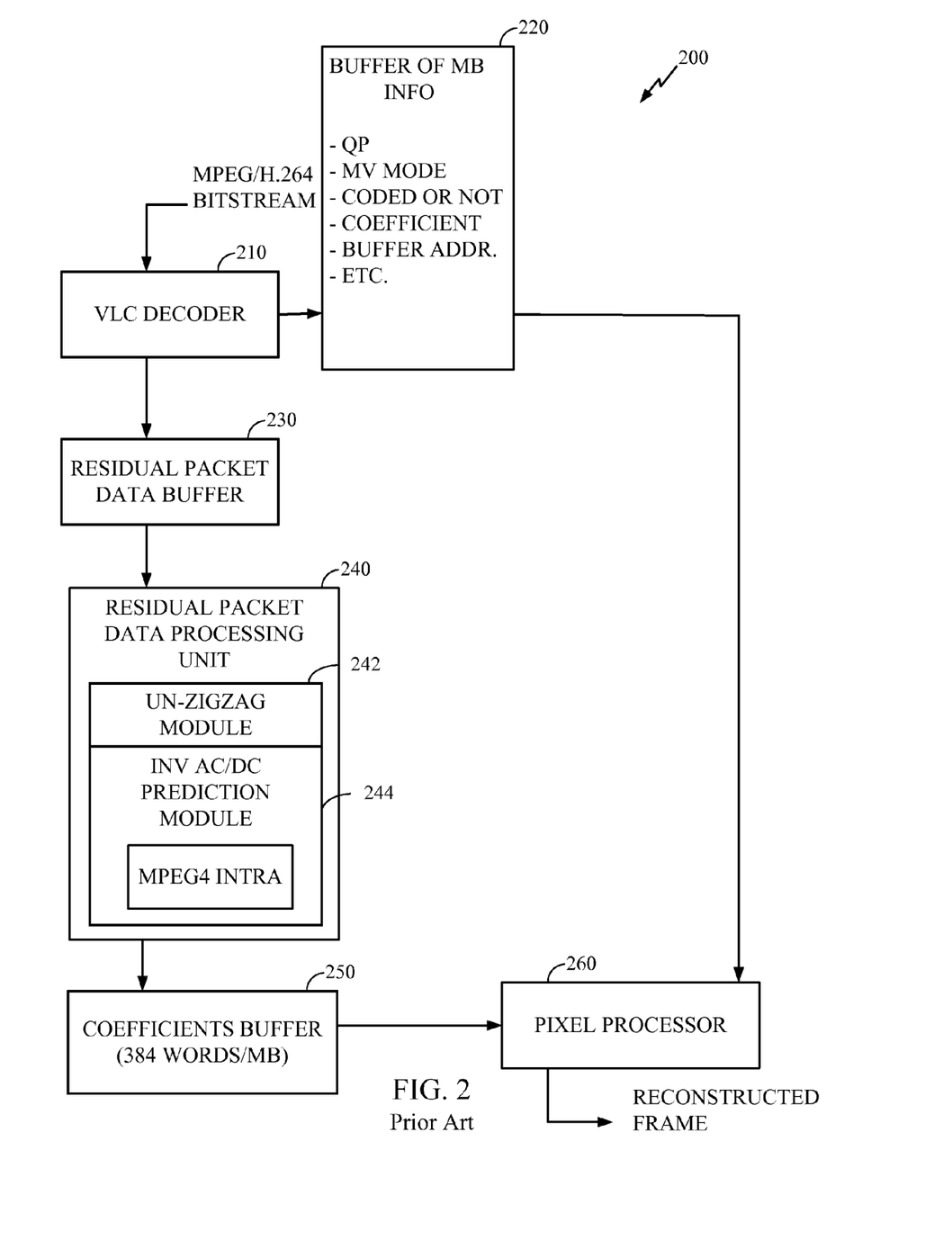
FIG. 2 shows a high-level block diagram of a conventional Video Decoder module.

FIG. 2 shows a high-level block diagram of a conventional VD module 200. Generally, the VD module 200 includes a variable length code (VLC) decoder 210, a buffer 220 of macroblock information, a residual packet data buffer 230, a residual packet data processing unit 240, a coefficients buffer 250 with 384 words/macroblock capacity, and a pixel processor 260.

In an inputted bitstream (e.g., MPEG-4-compliant bitstream), the VLC decoder 210 decodes the bitstream, performs syntax element parsing and separates macroblock information and residual packet data in two data packets. A first data packet (such as packet header information) is forwarded to the buffer 220 and includes macroblock (MB) information such as motion vectors, quantization parameters (QPs), coded or not coded, coefficients, buffer address and other properties used for configuring the pixel processor 260. A second data packet includes pixel quantized coefficient data in zigzag scan order and is forwarded to the buffer 230. For each macroblock, the parser packet data includes header information (mode, motion vector, etc.), and VLC decoded coefficient data information (either run-level pairs in MPEG-4 or VC-1, trailing-1, number of zeros before nonzero coefficient and nonzero coefficients in H264 CAVLC, or significant coefficient flag and nonzero coefficients in H264 CABAC).

In the residual packet data processing unit 240, the second data packet of the quantized coefficient data is un-zigzagged via an un-zigzag module 242 to a raster scan order. For MPEG-4 video bitstreams, inverse AC/DC prediction is also processed for MPEG-4 intra data via the inverse AC/DC prediction module 244. The output of the residual packet data processing unit 240 is sent to a coefficients buffer 250 which stores the coefficient data into 384 words/MB. The coefficient data includes both zero and non-zero coefficients.

Figure 3:
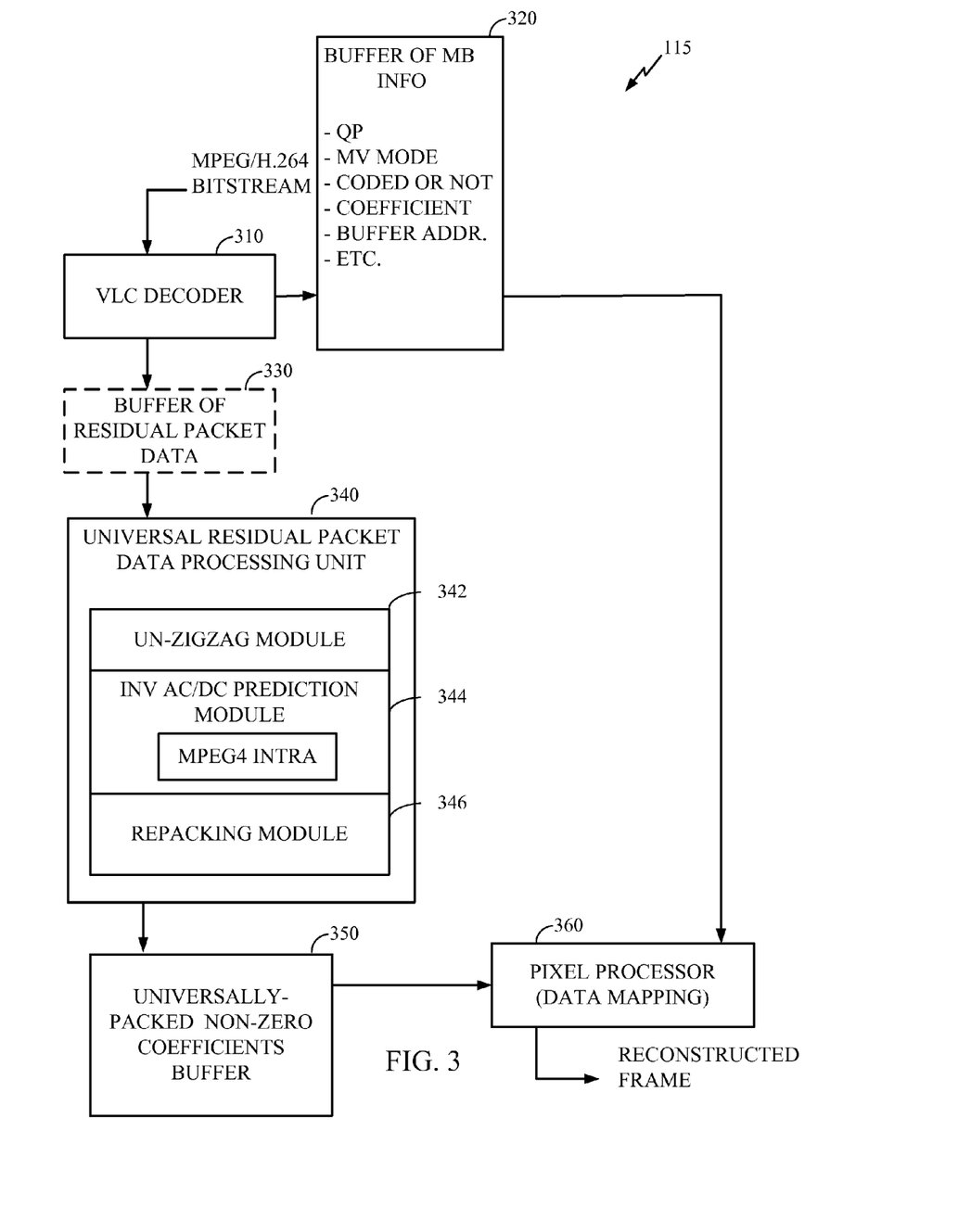
FIG. 3 shows a high-level block diagram of a Video Decoder module of the wireless device of FIG. 1.

FIG. 3 shows a high-level block diagram of a VD module 115 for use in wireless device 100. Generally, the VD module 115 includes a variable length code (VLC) decoder 310, a buffer 320 of macroblock information, an optional residual packet data buffer 330, a universal residual packet data processing unit 340, a universally-packed non-zero coefficients buffer 350, and a pixel processor 360. Since the universally-packed non-zero coefficients buffer 350 contains the non-zero coefficients, the valid data in buffer 350 may be less than 384 and may be a function of the number of non-zero coefficients. In another configuration, the buffer 350 may be larger than 384 word/macroblocks. For example, the size of buffer 350 may be designed for a worst-case size of (1+2*384) word/macroblocks, for a (location, level) format described later.

In an inputted bitstream (e.g., MPEG-4-compliant bitstream), the VLC decoder 310 decodes the bitstream, performs syntax element parsing and separates macroblock information and residual packet data in two data packets. A first data packet is forwarded to the buffer 320 and includes macroblock (MB) information such as motion vectors, quantization parameters (QPs), coded or not coded, coefficients, buffer address and other properties used for configuring the pixel processor 360. A second data packet (residual packet data) includes pixel quantized coefficient data in zigzag scan order and is, optionally, forwarded to the residual packet data buffer 330 before being processed by the universal residual packet data processing unit 340.

Figure 4A:
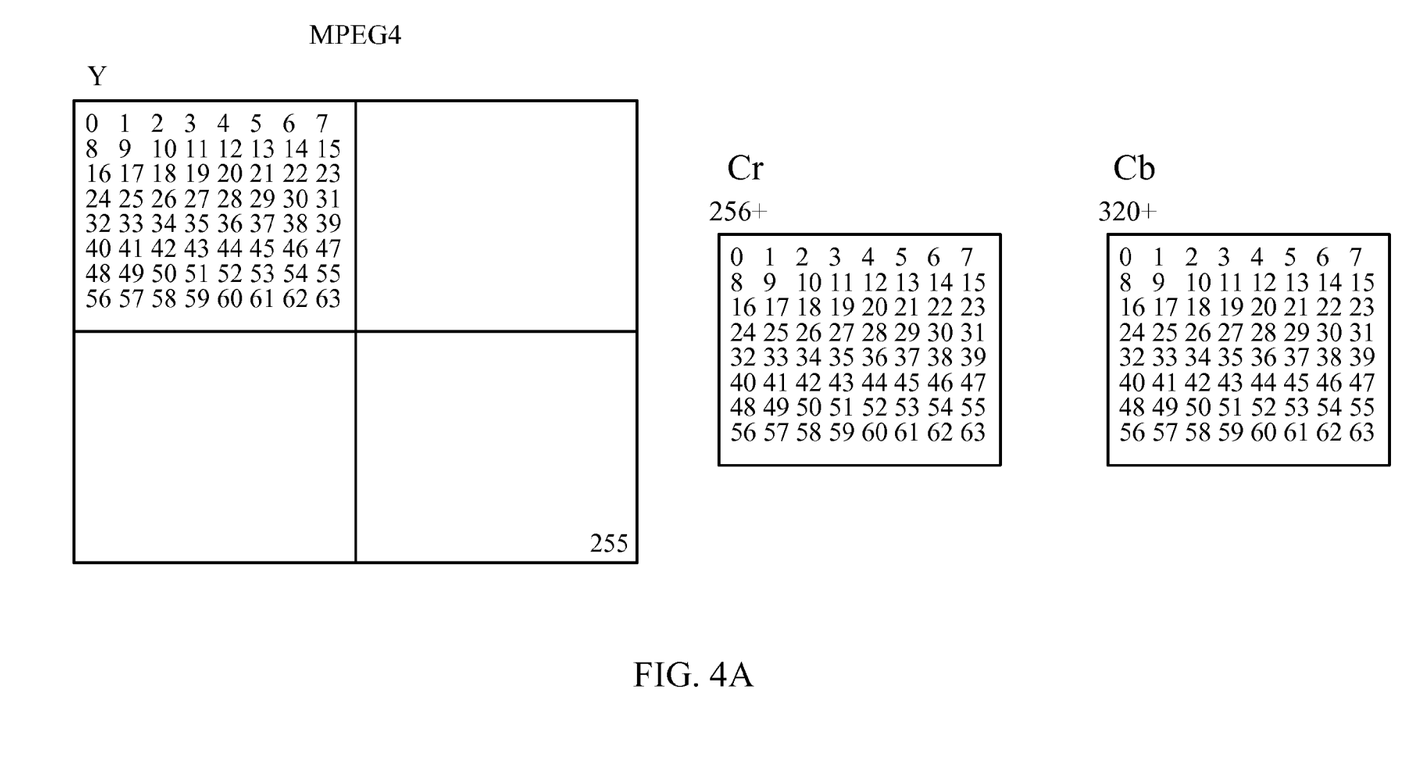
FIG. 4A shows a diagram illustrating formatting of coefficients in macroblocks of bitstreams compliant with the MPEG/VC-1 standards.
Figure 4B:
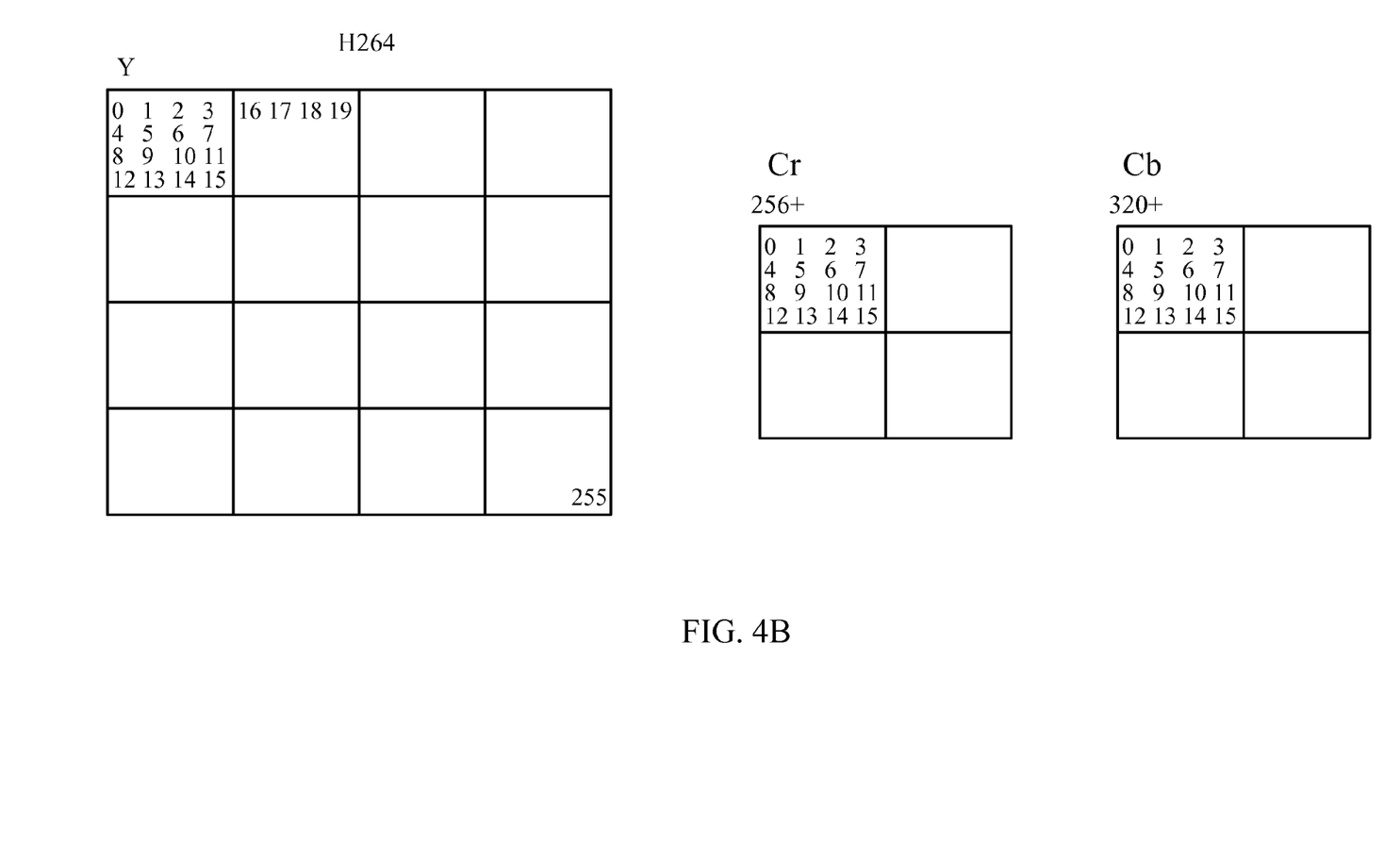
FIG. 4B shows a diagram illustrating formatting of coefficients in macroblocks of bitstreams compliant with the H.264 standard.

In the universal residual packet data processing unit 340, the second data packet of the quantized coefficient data is un-zigzagged by un-zigzag module 342 to into raster scan order shown in FIGS. 4A-4B. For MPEG-4 video bitstreams, inverse AC/DC prediction is also processed for MPEG-4 intra data by the inverse AC/DC prediction module 344. When performing the inverse AC/DC prediction, the optional buffer 330 may be used. However, buffer 330 need not be part of the VD module 115. Then, whether in MPEG format or H.246 format, the residual packet data processing unit 340 repacks the un-zigzagged quantized coefficient data into a codec-independent format in the repacking module 346. The repacked coefficient data (output data) is sent to a universally-packed non-zero coefficients buffer 350.

In the un-zigzag module 342, zero and non-zero coefficients in the macroblock are defined. The repacking module 346 generates in a codec-independent non-zero MB-packet, wherein each such non-zero coefficient is identified. The non-zero coefficients are identified using a bit map, run-level (RL) pairs or location-level (LL) pairs. For example, a non-zero coefficient for a location-level (LL) pair can be identified using a numerical pair (A, B) format, where A and B are respective descriptors of the location and value (or level) of the coefficient in each of the Y, Cr, or Cb component of the macroblock.

During repacking the non-zero coefficient data (output data) is re-arranged in a MB-packet including bit map, RL pairs or LL pairs of non-zero coefficient data by the repacking module 346. In the buffer 350, the non-zero MB-packet of non-zero coefficients are stored. In the case where location and level properties are use, each LL pair defines a location and a numerical value (or level) of a non-zero coefficient (i.e., coefficient having non-zero values of their respective properties) of the macroblock; however, the location of the data does not have to be arranged in increasing or decreasing order. Herein the terms "location" and "level" correspondingly relate to a position of a particular non-zero coefficient in the inputted video format and the value of that coefficient. Thus, the non-zero MB-packet is codec-independent. In the non-zero MB-packets, information for zero coefficients (i.e., coefficients having a numerical value equal to zero) is omitted, thus providing compression of the coefficient data of the respective macroblock.

The non-zero MB-packets stored in the universally-packed non-zero coefficients buffer 350 is provided from the buffer 350 to the pixel processor 360, where each non-zero MB-packet is used, together with the macroblock information, in the frame reconstruction routine performed by the processor 360. In the pixel processor 360, the omitted zero coefficients of the macroblock are restored, such as by using a data mapping of the non-zero MB-packet and placing the zero coefficients in gaps between the non-zero quantized coefficients.

FIGS. 4A-4B show diagrams illustrating formatting of coefficients in macroblocks of MPEG-4 (FIG. 4A) and H.264 (FIG. 4B) bitstreams. The macroblock includes Cr, Cb, and four Y components each having 64 coefficients (a total of 384 coefficients), wherein each coefficient is represented by a 16-bit word. In the non-zero MB-packet repacked in the repacking module 346, only data for non-zero coefficients of the macroblock is included, whereas zero coefficients are omitted.

Several repacking schemes that have been contemplated for the codec-independent non-zero MB-packet formed in the repacking module 346. In operation, each of these schemes reduces an amount of memory needed for storing the macroblock's coefficient data in practical situations and, therefore, to reduce traffic between the respective data storage (e.g., internal memory 126) and the pixel processor 360 and the bandwidth requirements for transmitting the traffic.

Figure 5:
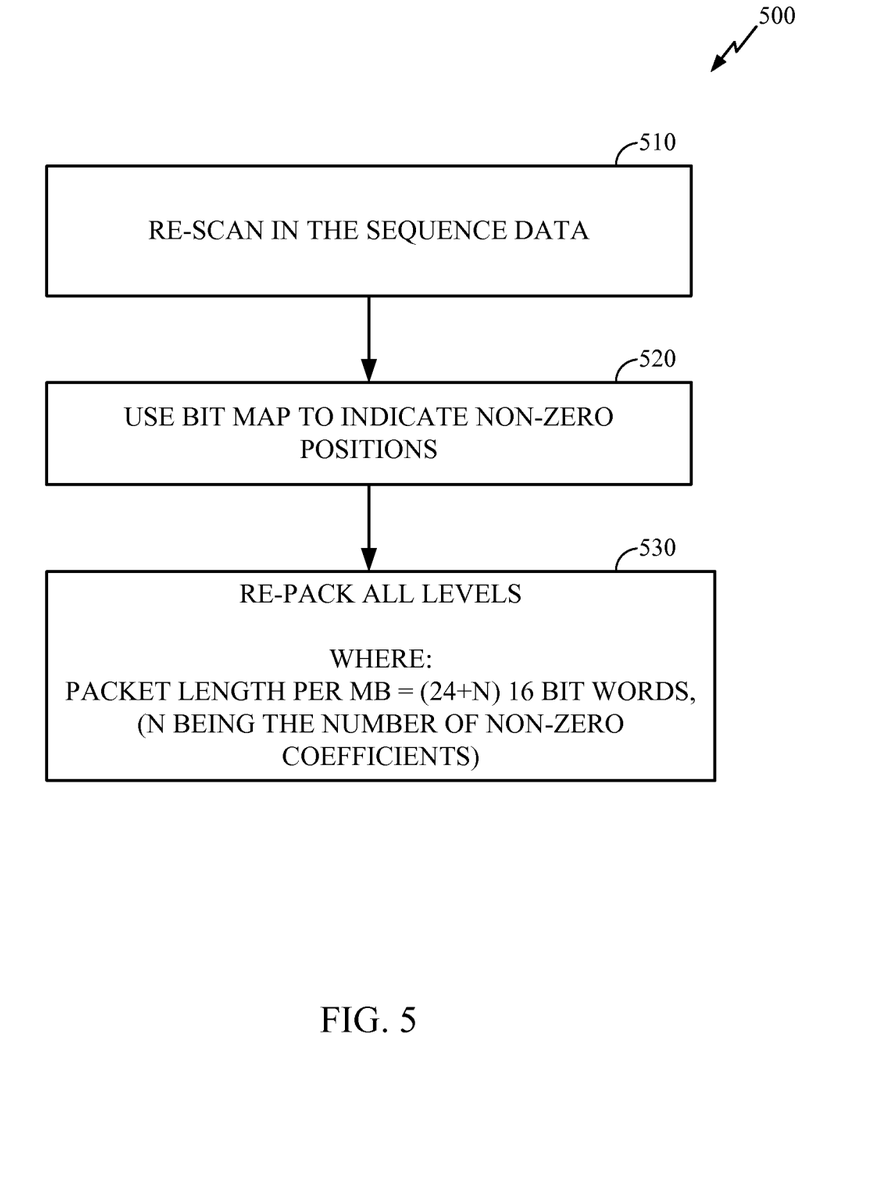
FIG. 5 shows a flowchart of a process for repacking the residual packet data into a codec-independent format.

FIG. 5 shows a flowchart of a process for repacking the residual packet data into a codec-independent format. The process 500 begins with re-scanning the un-zigzag ordered (raster scan order) coefficient data at block 510. After re-scanning the un-zigzagged residual packet data (hereinafter sometimes referred to as "sequence data") from the un-zigzag module 342, the re-scanned coefficients of the sequence data are listed in bit map order to indicate non-zero positions, at block 520. At block 530, the non-zero coefficients in the bit map are repacked into codec-independent non-zero MB-packets with a packet length. The packet length for each MB is equal to (24+N) 16-bit words, wherein N is a number of non-zero coefficients and $1 \leq N \leq 384$ and 24 16-bit words are used to hold a map of 384 coefficients. Thus, the quantized coefficients are repacked into a fixed pattern for all video standards.

Figure 6:
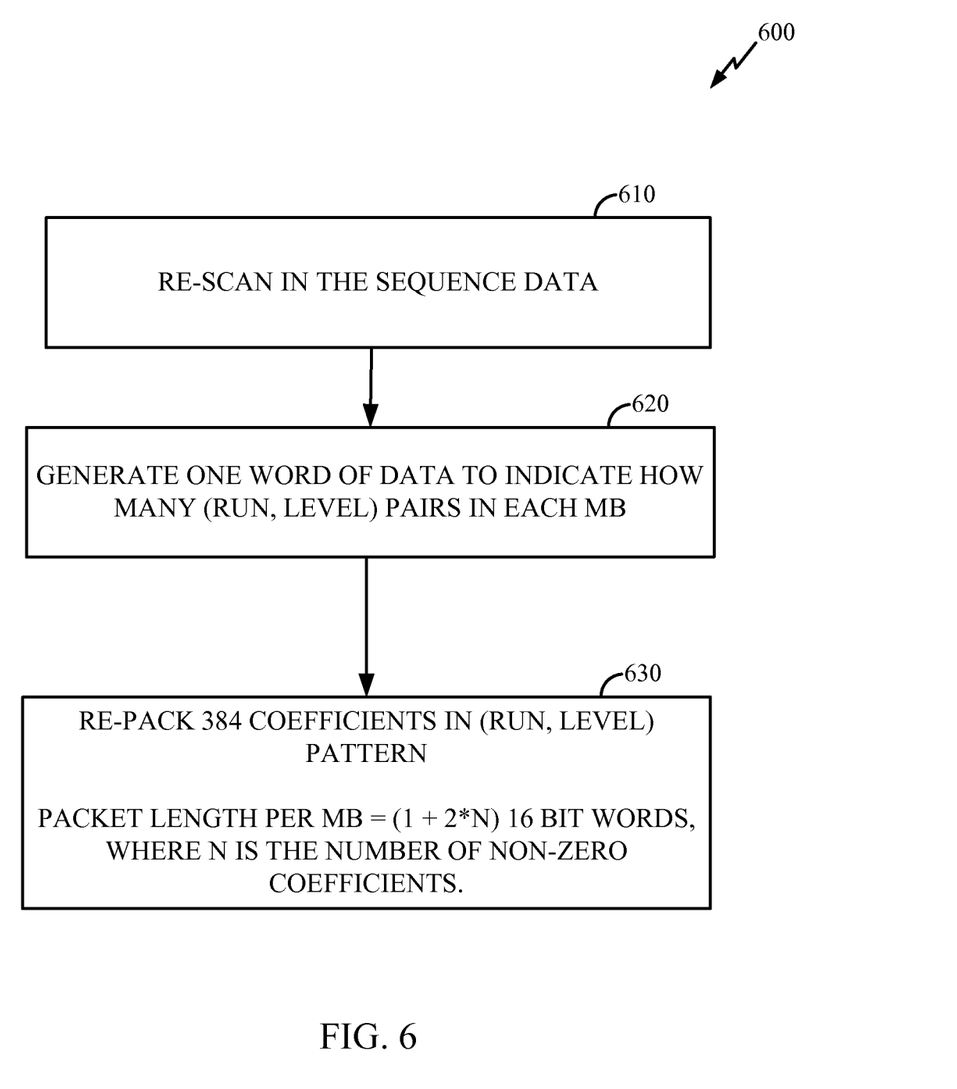
FIG. 6 shows a flowchart of a second process for repacking the residual packet data into a codec-independent format.

FIG. 6 shows a flowchart of a second process for repacking the residual packet data into a codec-independent format. The second process 600 begins with re-scanning the un-zigzag ordered (raster scan order) coefficient data at block 610. After re-scanning the un-zigzagged residual packet data (hereinafter sometimes referred to as "sequence data") from the un-zigzag module 342, the re-scanned coefficients may be arranged in a (run, level) format. This un-zigzag ordered coefficient data at block 610 is a new (run, level) format. After un-zigzagging the quantized residual packet data from block 610, one word of data is used to indicate how many RL pairs are in each MB, at block 620. At block 630, the non-zero coefficients are repacked into codec-independent non-zero MB-packets with a packet length. The packet length for each MB is equal to (1+2N) 16-bit words, wherein the one word generated at block 620 corresponds to the "1" 16-bit word in the (1+2N) 16-bit words. Thus, the quantized coefficients are repacked into a fixed pattern for all video standards.

Figure 7:
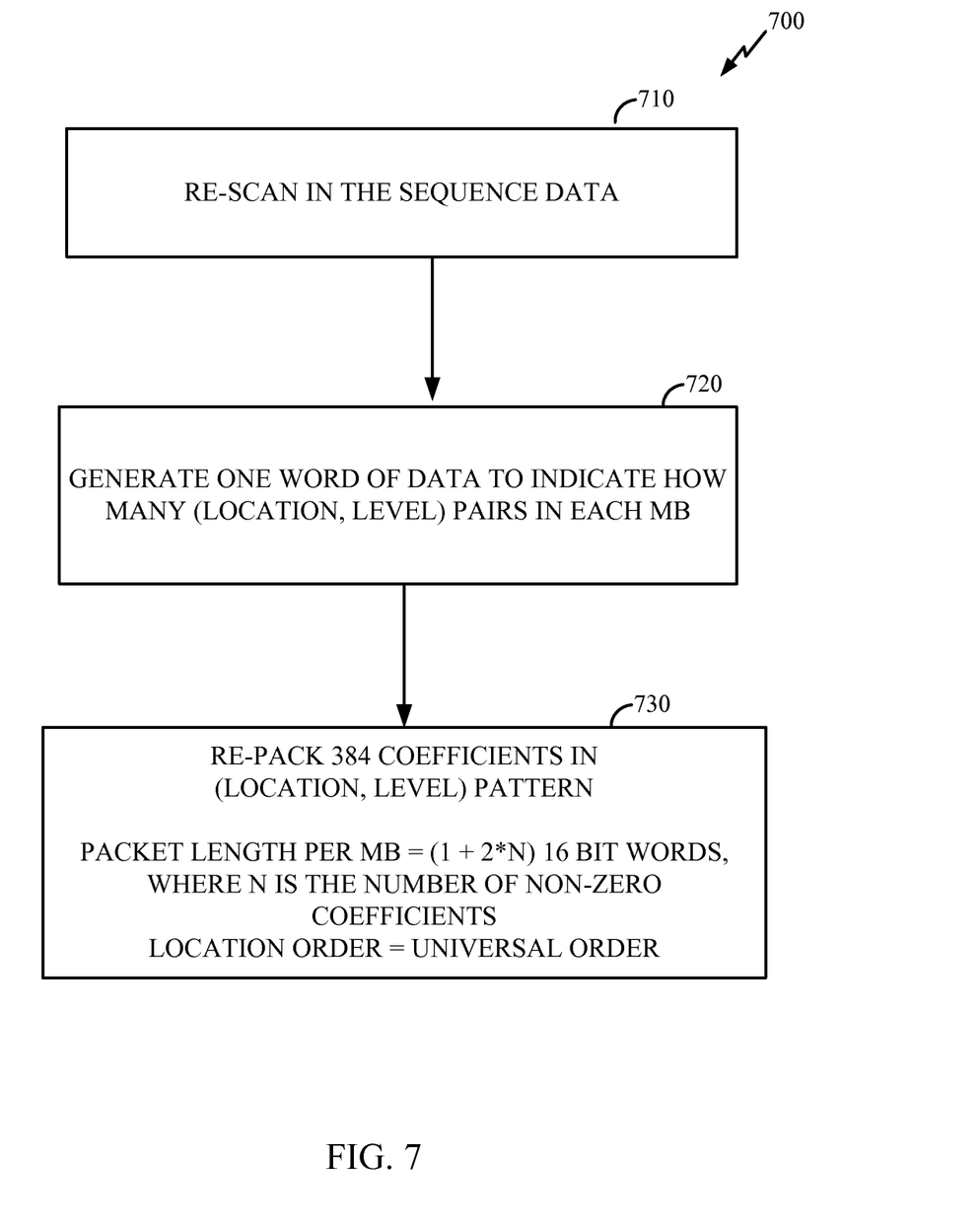
FIG. 7 shows a flowchart of a third process for repacking the residual packet data into a codec-independent format.

FIG. 7 shows a flowchart of a third process for repacking the residual packet data into a codec-independent format. The third process 700 begins with re-scanning the un-zigzag ordered (raster scan order) coefficient data at block 710. After re-scanning the un-zigzagged residual packet data (hereinafter sometimes referred to as "sequence data") from the un-zigzag module 342, the re-scanned coefficients may be arranged in a (location, level) format. After un-zigzagging the quantized residual packet data from block 710, one word of data is used to indicate how many LL pairs are in each MB, at block 720. At block 730, the non-zero coefficients are repacked into codec-independent non-zero MB-packets with a packet length. The packet length for each MB is equal to (1+2N) 16-bit words, wherein the one word generated at block 720 corresponds to the "1" 16-bit word in the (1+2N) 16-bit words. Thus, the quantized coefficients are repacked into a fixed pattern for all video standards.

In a preferred third embodiment, as in the second embodiment, the packet length is also equal to (1+2N) 16-bit words including one word for indicating how many non-zero quantized coefficients are in the macroblock, and each of the nonzero coefficients is described in the LL pair. The location information is only a by-product of the un-zigzag processing, and does not have to be in increasing or decreasing order for the non-zero coefficients. The format for the LL pair eliminates a need in re-sorting procedures used in the second process 600, and does not increase any cycle cost for the firmware development in the ARM or DSP processor.

Figure 8:
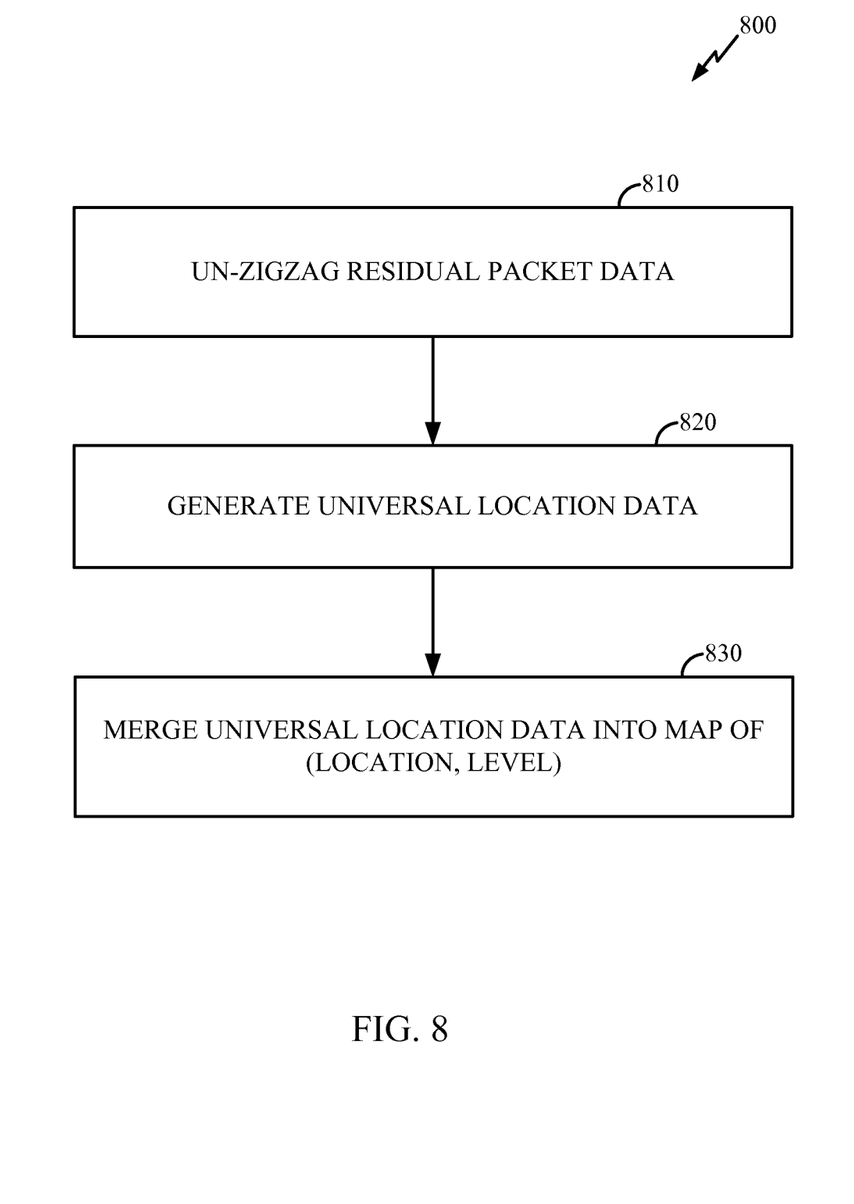
FIG. 8 shows a flowchart of a process for merging un-zigzag scan order into universal location and level data.

FIG. 8 shows a flowchart of a process 800 for merging un-zigzag scan order into universal location and level data. In the process 800, LL pairs may be generated directly from the un-zigzagged data. Thus, the process 800 begins at block 810 where the un-zigzagged residual packet data is generated such as by the un-zigzag module 342. At block 820, universal location data is generated. At block 830, the universal location data is merged into a map with LL pair for each coefficient.

In exemplary embodiments, the processes may be implemented in hardware, software, firmware, or any combination thereof in a form of a computer program product comprising one or more computer-executable instructions. When implemented in software, the computer program product may be stored on or transmitted using a computer-readable medium, which includes computer storage medium and computer communication medium.

The term "computer storage medium" refers herein to any medium adapted for storing the instructions that cause the computer to execute the processes. By way of example, and not limitation, the computer storage medium may comprise solid-sate memory devices, including electronic memory devices (e.g., RAM, ROM, EEPROM, and the like), optical memory devices (e.g. compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

The previous description of the disclosed configurations is provided to enable any person skilled in the art to make or use the disclosure. Various modifications to these configurations will be readily apparent to those skilled in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

What is claimed is:

1. An integrated circuit comprising:
   a processor configured to:
      receive a bitstream and to decode and separate macroblock information and residual packet data from the bitstream;
      determine coefficient data including non-zero coefficients and zero coefficients from the residual packet data;
      repack the non-zero coefficients into a data packet, omit the zero coefficients from the data packet, and include, in the data packet, information to identify the non-zero coefficients, such that the data packet has a packet length that corresponds to one of (1+2*N) 16-bit words and (24+N) 16-bit words, wherein N is a number of the non-zero coefficients; and
      reconstruct pixels from the data packet and the macroblock information;
   the integrated circuit further comprising:
      a memory containing said instructions.

2. The integrated circuit of claim 1, wherein the bitstream is compliant with at least one MPEG, VC-1 or H.264 encoding standard.

3. The integrated circuit of claim 1, wherein the processor is further operative to store the data packet in a universally-packed buffer.

4. The integrated circuit of claim 1, wherein said integrated circuit is a portion of a wireless device selected from the group consisting of a cellular phone, a video game console, a personal digital assistant (PDA), a laptop computer, a video-enabled device, and an audio/video-enabled device.

5. The integrated circuit of claim 1, wherein the data packet consists substantially of the non-zero coefficients and the information to identify the non-zero coefficients.

6. The integrated circuit of claim 1, wherein the information to identify the non-zero coefficients comprises:
   a bit map to map the non-zero coefficients, the data packet comprising a bit for each coefficient of the macroblock and a word for each of the non-zero coefficients.

7. The integrated circuit of claim 1, wherein the information to identify the non-zero coefficients further comprises:
   location and level pairs, each one of the location and level pairs defining a location and a level, the data packet comprising one word of data to indicate how many of the location and level pairs are in each macroblock and two words specifying the location and level for each of the non-zero quantized coefficients.

8. The integrated circuit of claim 1, wherein the information to identify the non-zero coefficients further comprises:
   run and level pairs, each one of the run and level pairs defining a run and a level, the data packet comprising one word of data to indicate how many of the run and level pairs are in each macroblock and two words specifying the run and level for each of the non-zero quantized coefficients.

9. The integrated circuit of claim 1, wherein the processor is further configured to map the non-zero coefficients, and to provide the zero coefficients between the non-zero coefficients based on the information to identify the non-zero coefficients.

10. An apparatus comprising:
    a processor configured to:
       receive a bitstream and to decode and separate macroblock information and residual packet data from the bitstream;
       determine coefficient data including non-zero coefficients and zero coefficients from the residual packet data;
       repack the non-zero coefficients into a data packet, omit the zero coefficients from the data packet, and include, in the data packet, information to identify the non-zero coefficients, such that the data packet has a packet length that corresponds to one of (1+2*N) 16-bit words and (24+N) 16-bit words, wherein N is a number of the non-zero coefficients; and
       reconstruct pixels from the data packet and the macroblock information; and
    the apparatus further comprising:
       a memory containing said instructions.

11. The apparatus of claim 10, wherein the bitstream is compliant with at least one MPEG, VC-1 or H.264 encoding standard.

12. The apparatus of claim 10, wherein the processor is further operative to store the data packet in a universally-packed buffer.

13. The apparatus of claim 10, wherein said apparatus is a portion of a wireless device selected from the group consisting of a cellular phone, a video game console, a personal digital assistant (PDA), a laptop computer, a video-enabled device, and an audio/video-enabled device.

14. The apparatus of claim 10, wherein the information to identify the non-zero coefficients comprises:
    a bit map to map the non-zero coefficients, the data packet comprising a bit for each coefficient of the macroblock and a word for each of the non-zero coefficients.

15. The apparatus of claim 10, wherein the information to identify the non-zero coefficients further comprises:
 location and level pairs, each one of the location and level pairs defining a location and a level, the data packet comprising one word of data to indicate how many of the location and level pairs are in each macroblock and two words specifying the location and level for each of the non-zero quantized coefficients.

16. The apparatus of claim 10, wherein the information to identify the non-zero coefficients further comprises:
 run and level pairs, each one of the run and level pairs defining a run and a level, the data packet comprising one word of data to indicate how many of the run and level pairs are in each macroblock and two words specifying the run and level for each of the non-zero quantized coefficients.

17. The apparatus of claim 10, wherein the processor is further configured to map the non-zero coefficients, and to provide the zero coefficients between the non-zero coefficients based on the information to identify the non-zero coefficients.

18. An apparatus comprising:
 first means for receiving a bitstream and decoding and separating macroblock information and residual packet data from the bitstream;
 second means for determining coefficient data including non-zero coefficients and zero coefficients from the residual packet data;
 third means for repacking the non-zero coefficients into a data packet, omitting the zero coefficients from the data packet, and including, in the data packet, information to identify the non-zero coefficients, such that the data packet has a packet length that corresponds to one of 1+2*N 16-bit words and 24+N 16-bit words, wherein N is a number of the non-zero coefficients; and
 fourth means for reconstructing pixels from the and the macroblock information.

19. The apparatus of claim 18, further comprising fifth means for storing the data packet.

20. The apparatus of claim 18, wherein the information to identify the non-zero coefficients comprises one or more of:
 a bit map to map the non-zero coefficients, the data packet comprising a bit for each coefficient of the macroblock and a word for each of the non-zero coefficients;
 location and level pairs, each one of the location and level pairs defining a location and a level, the data packet comprising one word of data to indicate how many of the location and level pairs are in each macroblock and two words specifying the location and level for each of the non-zero quantized coefficients; and
 run and level pairs, each one of the run and level pairs defining a run and a level, the data packet comprising one word of data to indicate how many of the run and level pairs are in each macroblock and two words specifying the run and level for each of the non-zero quantized coefficients.

21. The apparatus of claim 18, wherein the fourth means for reconstructing pixels from the data packet and the macroblock information comprises means for mapping the non-zero coefficients, and providing the zero coefficients between the non-zero coefficients, based on the information to identify the non-zero coefficients.

22. A computer program product for performing texture decoding in a macroblock of a bitstream, the computer program product including a non-transitory computer readable storage medium having instructions for causing a computer to:
 receive a bitstream and decode and separate macroblock information and residual packet data from the bitstream;
 determine coefficient data including non-zero coefficients and zero coefficients from the residual packet data;
 repack the non-zero coefficients into a data packet, omit the zero coefficients from the data packet, and include, in the data packet, information to identify the non-zero coefficients, such that the data packet has a packet length that corresponds to one of 1+2*N 16-bit words and 24+N 16-bit words, wherein N is a number of the non-zero coefficients; and
 reconstruct pixels from the data packet and the macroblock information.

23. The computer program product of claim 22, wherein the bitstream is compliant with at least one MPEG, VC-1 or H.264 encoding standard.

24. The computer program product of claim 22, wherein the instructions further cause the computer to store the data packet in a universally-packed buffer.

25. The computer program product of claim 22, wherein the information to identify the non-zero coefficients comprises one or more of:
 a bit map to map the non-zero coefficients, the data packet comprising a bit for each coefficient of the macroblock and a word for each of the non-zero coefficients;
 location and level pairs, each one of the location and level pairs defining a location and a level, the data packet comprising one word of data to indicate how many of the location and level pairs are in each macroblock and two words specifying the location and level for each of the non-zero quantized coefficients; and
 run and level pairs, each one of the run and level pairs defining a run and a level, the data packet comprising one word of data to indicate how many of the run and level pairs are in each macroblock and two words specifying the run and level for each of the non-zero quantized coefficients.

26. The computer program product of claim 22, wherein the instructions for causing a computer to reconstruct pixels from the data packet and the macroblock information comprise instructions for causing a computer to map the non-zero coefficients, and providing the zero coefficients between the non-zero coefficients, based on the information to identify the non-zero coefficients.

27. A method of texture decoding in a macroblock of a bitstream, comprising:
 receiving a bitstream and decoding and separating macroblock information and residual packet data from the bitstream;
 determining, with at least one processor or circuit, coefficient data including non-zero coefficients and zero coefficients from the residual packet data;
 repacking, with at least one processor or circuit, the non-zero coefficients into a data packet, omitting the zero coefficients from the data packet, and including, in the data packet, information to identify the non-zero coefficients, such that the data packet has a packet length that corresponds to one of 1+2*N 16-bit words and 24+N 16-bit words, wherein N is a number of the non-zero coefficients; and
 reconstructing pixels from the and the macroblock information.

28. The method of claim 27, further comprising storing the data packet in a universally-packed buffer.

29. The method of claim 27, wherein the information to identify the non-zero coefficients comprises one or more of:
- a bit map to map the non-zero coefficients, the data packet comprising a bit for each coefficient of the macroblock and a word for each of the non-zero coefficients;
- location and level pairs, each one of the location and level pairs defining a location and a level, the data packet comprising one word of data to indicate how many of the location and level pairs are in each macroblock and two words specifying the location and level for each of the non-zero quantized coefficients; and
- run and level pairs, each one of the run and level pairs defining a run and a level, the data packet comprising one word of data to indicate how many of the run and level pairs are in each macroblock and two words specifying the run and level for each of the non-zero quantized coefficients.

30. The method of claim 27, wherein reconstructing pixels from the data packet and the macroblock information comprises mapping the non-zero coefficients, and providing the zero coefficients between the non-zero coefficients, based on the information to identify the non-zero coefficients.

* * * * *